United States Patent
Chen et al.

(10) Patent No.: US 6,751,635 B1
(45) Date of Patent: Jun. 15, 2004

(54) FILE DELETION AND TRUNCATION USING A ZOMBIE FILE SPACE

(75) Inventors: Ray Chen, Campbell, CA (US); John K. Edwards, Sunnyvale, CA (US); Kayuri Patel, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 279 days.

(21) Appl. No.: 09/642,066

(22) Filed: Aug. 18, 2000

(51) Int. Cl.[7] .............................................. G06F 17/30
(52) U.S. Cl. ..................... 707/200; 707/10; 707/202; 707/206
(58) Field of Search ........................ 707/10, 201, 203, 707/206, 204, 205, 200, 202; 711/113, 114; 709/203, 219, 229

(56) References Cited

U.S. PATENT DOCUMENTS

| | | | | |
|---|---|---|---|---|
| 4,888,681 A | * | 12/1989 | Barnes et al. ................ | 707/101 |
| 4,937,763 A | | 6/1990 | Mott .......................... | 702/183 |
| 5,067,099 A | | 11/1991 | McCown et al. ............ | 702/183 |
| 5,088,031 A | * | 2/1992 | Takasaki et al. ............. | 709/100 |
| 5,155,835 A | | 10/1992 | Belsan ........................ | 711/114 |
| 5,193,184 A | * | 3/1993 | Belsan et al. .................. | 711/4 |
| 5,317,728 A | * | 5/1994 | Tevis et al. .................. | 707/204 |
| 5,403,639 A | * | 4/1995 | Belsan et al. ................ | 707/204 |
| 5,535,375 A | * | 7/1996 | Eshel et al. .................... | 703/27 |
| 5,557,747 A | * | 9/1996 | Rogers et al. ............... | 709/223 |
| 5,564,037 A | * | 10/1996 | Lam ............................ | 711/161 |
| 5,617,568 A | | 4/1997 | Ault et al. | |
| 5,832,522 A | * | 11/1998 | Blickenstaff et al. ........ | 707/204 |
| 5,946,685 A | * | 8/1999 | Cramer et al. ................. | 707/10 |
| 5,963,962 A | | 10/1999 | Hitz et al. ................... | 707/202 |
| 5,991,753 A | * | 11/1999 | Wilde ............................. | 707/2 |
| 5,996,054 A | * | 11/1999 | Ledain et al. ................ | 711/203 |
| 6,026,402 A | | 2/2000 | Vossen et al. | |
| 6,041,334 A | * | 3/2000 | Cannon ....................... | 707/204 |
| 6,101,508 A | * | 8/2000 | Wolff .......................... | 709/223 |
| 6,112,211 A | * | 8/2000 | Bradshaw et al. ........... | 707/205 |
| 6,173,293 B1 | * | 1/2001 | Thekkath et al. ............ | 707/201 |
| 6,247,024 B1 | * | 6/2001 | Kincaid ....................... | 707/204 |
| 6,249,792 B1 | * | 6/2001 | Zwilling et al. ............. | 707/205 |
| 6,289,356 B1 | * | 9/2001 | Hitz et al. ................... | 707/201 |
| 6,334,114 B1 | * | 12/2001 | Jacobs et al. ................. | 705/26 |
| 6,353,878 B1 | * | 3/2002 | Dunham ...................... | 711/162 |
| 6,366,988 B1 | * | 4/2002 | Skiba et al. ................. | 711/165 |
| 6,529,921 B1 | * | 3/2003 | Berkowitz et al. ........ | 715/500.1 |
| 2002/0083081 A1 | | 6/2002 | Chen et al. | |
| 2002/0089508 A1 | * | 7/2002 | Sowizral et al. ............. | 345/522 |

FOREIGN PATENT DOCUMENTS

| | | | |
|---|---|---|---|
| DE | 694 25 658 T2 | 8/2000 | ............ G06F/11/14 |
| EP | 0 474 395 A2 | 8/1991 | |
| EP | 0537098 | 4/1993 | ............... 400/332.4 |
| EP | 702 815 B1 | 8/2000 | ............ G06F/11/14 |
| WO | WO 94/29807 A1 | 12/1994 | ............ G06F/15/40 |
| WO | WO 00/11553 A1 | 3/2000 | ............ G06F/11/14 |
| WO | WO 02/19110 A2 | 8/2001 | |

OTHER PUBLICATIONS

Rodriquez et al., A new Checkpoint Mechanism for real time Operating System, Undated, Univerdisad Politecnica de Madrid, Spain, pp. 55–62.*

(List continued on next page.)

*Primary Examiner*—Jean R. Homere
*Assistant Examiner*—Leslie Wong
(74) *Attorney, Agent, or Firm*—Swernofsky Law Group PC

(57) ABSTRACT

A method and system for reliably performing extra-long operations in a reliable state-full system (such as a file system). The file system includes a separate portion of the file system reserved for files having extra-long operations in progress, including file deletion and file truncation. This separate portion of the file system is called the zombie file space; it includes a separate name space from the regular ("live") file system that is accessible to users, and is maintained as part of the file system when recording a consistency point.

27 Claims, 4 Drawing Sheets

OTHER PUBLICATIONS

Ott et al., SRED: Stabilized RED, undated, Bellcore and Bell Laboratory, pp. 1–10.*

Chung et al., Checkpointing in CosMiC: a User–level Process Migration Environment, 1997 IEEE, pp. 187–193.*

Elnozahy et al., A Survey of Rollback–Recovery Protocols in Message–Passing Systems, ACM Computing surveys, vol. 34, No. 3, Sep. 2002, pp. 375–408.*

Kleiman et al.; Using NUMA Interconnects For Highly Available Filers; IEEE Micro. 1999; pp. 42–48. XP002164052.

Chia Chao et al., "Mime: A High Performance Storage Device With Strong Recovery Guarantees", Concurrent Systems Project, HP Laboratories, Mar. 18, 1992.

Dave Hitz, James Lau & Michael Malcolm, Network Appliance, Technical Report 3002, Rev. C 3/95, "File System Design for an NFS File Server Appliance", Usenix Winter 1994, San Francisco, CA, 1994 The Usenix Association, Jan., 1994.

David Hitz, "Technical Report TR01: An NFS File Server Appliance", Rev. A 8/93, Network Appliance Corporation, Santa Clara, CA.

Mulqueen, John T., Product Analysis Review. Communications Week, vol. 452, p. 25, May 3, 1993.

John Ousterhout & Fred Douglis, "Beating the I/O Bottleneck: A Case for Log–Structured File Systems". Electrical Engineering and Computer Sciences, UC Berkeley, CA, Oct., 1988.

Network Appliance. Data ONTAP Event Management System, Aug. 10, 2000.

David Simpson, "'Appliances' Take Over File Server Role", Digital News and Review, vol. 11, No. 6, pp. 1–2, Mar. 21, 1994.

TUX 2: Slashdot.com TUX 2 "The File System That Would Be King", Microsoft Internet Explorer, Oct. 20, 2000.

Gray et al. "Transaction processing: Concepts and techniques." 1993, Morgan Kaufmann, San Francisco, pp. 724–732.

Hutchinson et al. "Logical vs. physical file system back up." Third Symposium on Operating Systems Design and Implementation, New Orleans, LA, USA, Feb. 22–25, 1999, pp. 239–249.

* cited by examiner

FILE DELETION AND TRUNCATION USING A ZOMBIE FILE SPACE

BACKGROUND OF THE INVENTION

1. Field of the Invention

This invention relates to file server systems, including those file server systems in which it is desired to maintain reliable file system consistency.

2. Related Art

In systems providing file services, such as those including file servers and similar devices, it is generally desirable for the server to provide a file system that is reliable despite the possibility of error. For example, it is desirable to provide a file system that is reliably in a consistent state, regardless of problems that might have occurred with the file server, and regardless of the nature of the file system operations requested by client devices.

One known method of providing reliability in systems that maintain state (including such state as the state of a file system or other set of data structures) is to provide for recording checkpoints at which the system is known to be in a consistent state. Such checkpoints, sometimes called "consistency points," each provide a state to which the system can retreat in the event that an error occurs. From the most recent consistency point, the system can reattempt each operation to reach a state it was in before the error.

One problem with this known method is that some operations can require substantial amounts of time in comparison with the time between consistency points. For example, in the WAFL file system (as further described in the Incorporated Disclosures), operations on very large files can require copying or modifying very large numbers of file blocks in memory or on disk, and can therefore take a substantial fraction of the time from one consistency point to another. In the WAFL file system, two such operations are deleting very large files and truncating very large files. Accordingly, it might occur that recording a consistency point cannot occur properly while one of these extra-long operations is in progress.

The fundamental requirement of a reliable file system is that the state of the file system recorded on non-volatile storage must reflect only completed file system operations. In the case of a file system like WAFL that issues checkpoints, every file system operation must be complete between two checkpoints. In the earliest versions of the WAFL file system there was no file deletion manager present, thus very large files created a problem as it was possible that such large files could not be deleted between the execution of two consistency checkpoints.

This problem was partially solved in later versions of the WAFL file system, where a file deletion manager was assigned to perform the operation of file deletion, and a consistency point manager was assigned to perform the operation of recording a consistency point. The file deletion manager would attempt to resolve the problem of extra-long file deletions by repeatedly requesting more time from the consistency point manager, thus "putting off" the consistency point manager until a last-possible moment. However, at that last-possible moment, the file deletion manager would be required to give way to the consistency point manager, and allow the consistency point manger to record the consistency point. When this occurred, the file deletion manager would be unable to complete the file deletion operation. In that earlier version of the WAFL file system, instead of completing the file deletion operation, the file deletion manager would move the file to a "zombie file" list to complete the file deletion operation. At a later time, a zombie file manager would re-attempt the file deletion operation for those files on the zombie file list.

While this earlier method achieved the general result of performing file deletions on very large files, it has the drawbacks that it is a source of unreliability in the file system. First, the number of files that could be processed simultaneously as zombie files was fixed in the previous version.

Second, the file deletion manager and crash recovery mechanism did not communicate. The file deletion manager did not notify the crash recovery mechanism that a file was being turned into a zombie and the crash recovery mechanism was unable to create zombie files. Thus, to allow a checkpoint to be recorded, a long file would have to be turned into a zombie. If the system crashed at this point, the crash recovery mechanism might not be able to correctly recover the file system since it is unaware that a zombie file should be created and was incapable of creating zombie files should the need arise.

Third, since the file deletion manager and replay mechanism did not communicate the free space reported could be inaccurately reported. Attempts to restore state could fail, because the amount of free space could be different than that actually available.

Fourth, the earlier method is non-deterministic in the sense that it is not assured whether any particular file deletion operation will be completed before or after a selected consistency point. Moreover, the earlier method does not resolve problems associated with other extra-long file operations, such as requests to truncate very large files to much smaller length.

Accordingly, it would be advantageous to provide a technique for extra-long operations in a reliable state-full system (such as a file system), that is not subject to the drawbacks of the known art. Preferably, in such a technique, those parts of the system responsible for recording of consistency points are fully aware of the intermediate states of extra-long operations, the performance of extra-long operations is relatively deterministic, and performance of extra-long operations is atomic with regard to consistency points.

SUMMARY OF THE INVENTION

The invention provides a method and system for reliably performing extra-long operations in a reliable state-full system (such as a file system). The system records consistency points, or otherwise assures reliability, notwithstanding the continuous performance of extra-long operations and the existence of intermediate states for those extra-long operations. Moreover, performance of extra-long operations is both deterministic and atomic with regard to consistency points (or other reliability techniques used by the system).

The file system includes a separate portion of the file system reserved for files having extra-long operations in progress, including file deletion and file truncation. This separate portion of the file system is called the zombie file space; it includes a separate name space from the regular ("live") file system that is accessible to users, and is maintained as part of the file system when recording a consistency point. The file system includes a file deletion manager that determines, before beginning any file deletion operation, whether it is necessary to first move the file being deleted to the zombie file space. The file system includes a zombie file deletion manager that performs portions of the file deletion operation on zombie files in atomic units.

The file system also includes a file truncation manager. Before beginning any file truncation operation, the file truncation manager determines whether it is necessary to create a complementary file called an "evil twin" file. The truncation manager will move all blocks to be truncated from the file being truncated to the evil twin file. Moving blocks is typically faster and less resource-intensive than deleting blocks. The "evil twin" is subsequently transformed into a zombie file. The file system includes a zombie file truncation manager that can then perform truncation of the zombie file asynchronously in atomic units. Furthermore, the number of files that can be linked to the zombie filespace is dynamic allowing the zombie filespace the ability to grow and shrink as required to process varying numbers of files.

An additional advantage provided by the file system is that files having attached data elements, called "composite" files, can be subject to file deletion and other extra-long operations in a natural and reliable manner. The file system moves the entire composite file to the zombie file space, deletes each attached data element individually, and thus resolves the composite file into a non-composite file. If the non-composite file is sufficiently small, the file deletion manager can delete the non-composite file without further need for the zombie file space. However, if the non-composite file is sufficiently large, the file deletion manager can delete the non-composite file using the zombie file space.

The invention provides an enabling technology for a wide variety of applications for reliable systems, so as to obtain substantial advantages and capabilities that are novel and non-obvious in view of the known art. Examples described below primarily relate to reliable file systems, but the invention is broadly applicable to many different types of systems in which reliability and extra-long operations are both present.

LEXICOGRAPHY

The following terms refer to or relate to aspects of the invention as described below. The descriptions of general meanings of these terms are not intended to be limiting, only illustrative. live filespace—This term generally refers to a storage area within a file server where files are available to system users.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

DETAILED DESCRIPTION OF THE PREFERRED EMBODIMENT

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Related Applications

Inventions described herein can be used in conjunction with inventions described in the following documents.

U.S. patent application Ser. No. 09/642,062, filed Aug. 18, 2000, in the name of Rajesh Sundaram, et al, titled "Dynamic Data Space", Allowed but not yet published U.S. patent application Ser. No. 09/642,061, filed Aug. 18, 2000, in the name of Blake Lewis et al titled "Instant Snapshot."-pending U.S. patent application Ser. No. 09/642,065, filed Aug. 18, 2000, in the name of Douglas Doucette, et al, titled "Improved Space Allocation in a Write Anywhere File System." issued Oct. 21, 2003 with U.S. Pat. No. 6,636,879 and U.S. patent application Ser. No. 09/642,064, filed Aug. 18, 2000, in the name of Scott SCHOENTHAL, et al, titled "persistent and reliable Delivery of Event Messages." pending Each of these documents is hereby incorporated by reference as if fully set forth herein. This application claims priority of each of these documents. These documents are collectively referred to as the "Incorporated Disclosures."

System Elements

Figure 1:
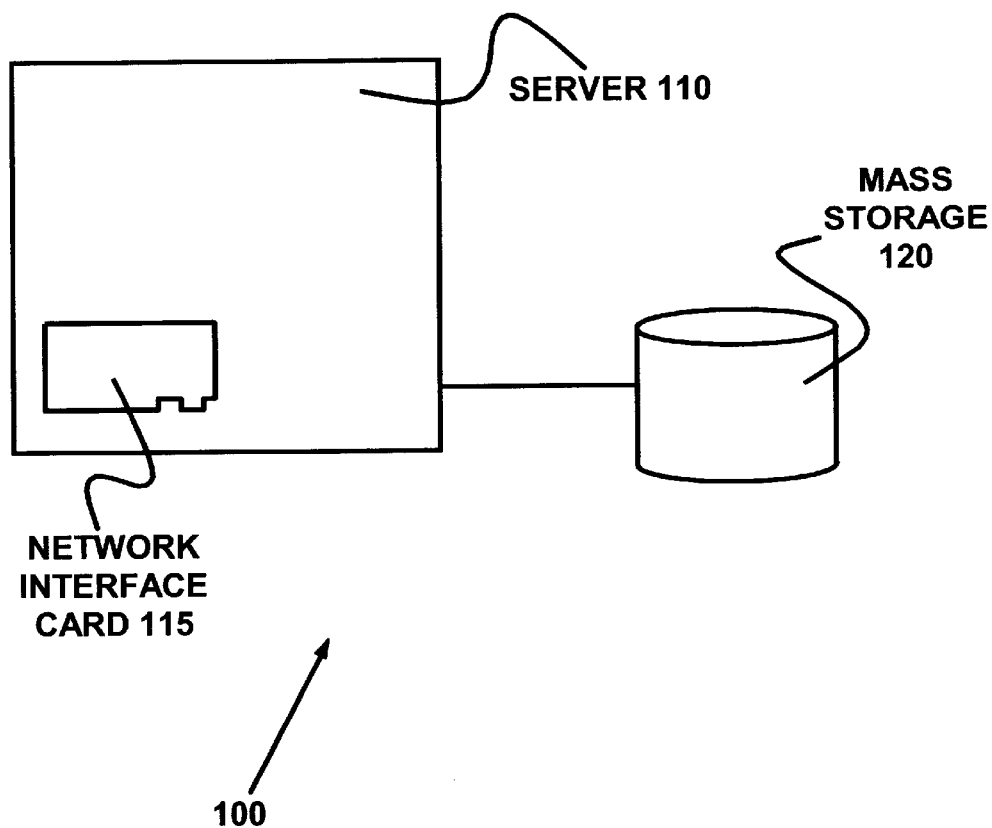
FIG. 1 shows a block diagram of a portion of a system using a zombie file space.

FIG. 1 shows a block diagram of a portion of a system using a zombie file space.

A system 100 includes a file server 110 including a processor (not shown but understood by one skilled in the art), program and data memory (not shown but understood by one skilled in the art), network interface card 115, and a mass storage 120

The network interface card 115 couples the file server 110 to a network. In a preferred embodiment, the network includes an Internet, intranet, extranet, virtual private network, enterprise network, or another form of communication network.

The mass storage 120 can include any device for storing relatively large amounts of information, such as magnetic disks or tapes, optical drives, or other types of mass storage.

File Structure Example

Figure 2:
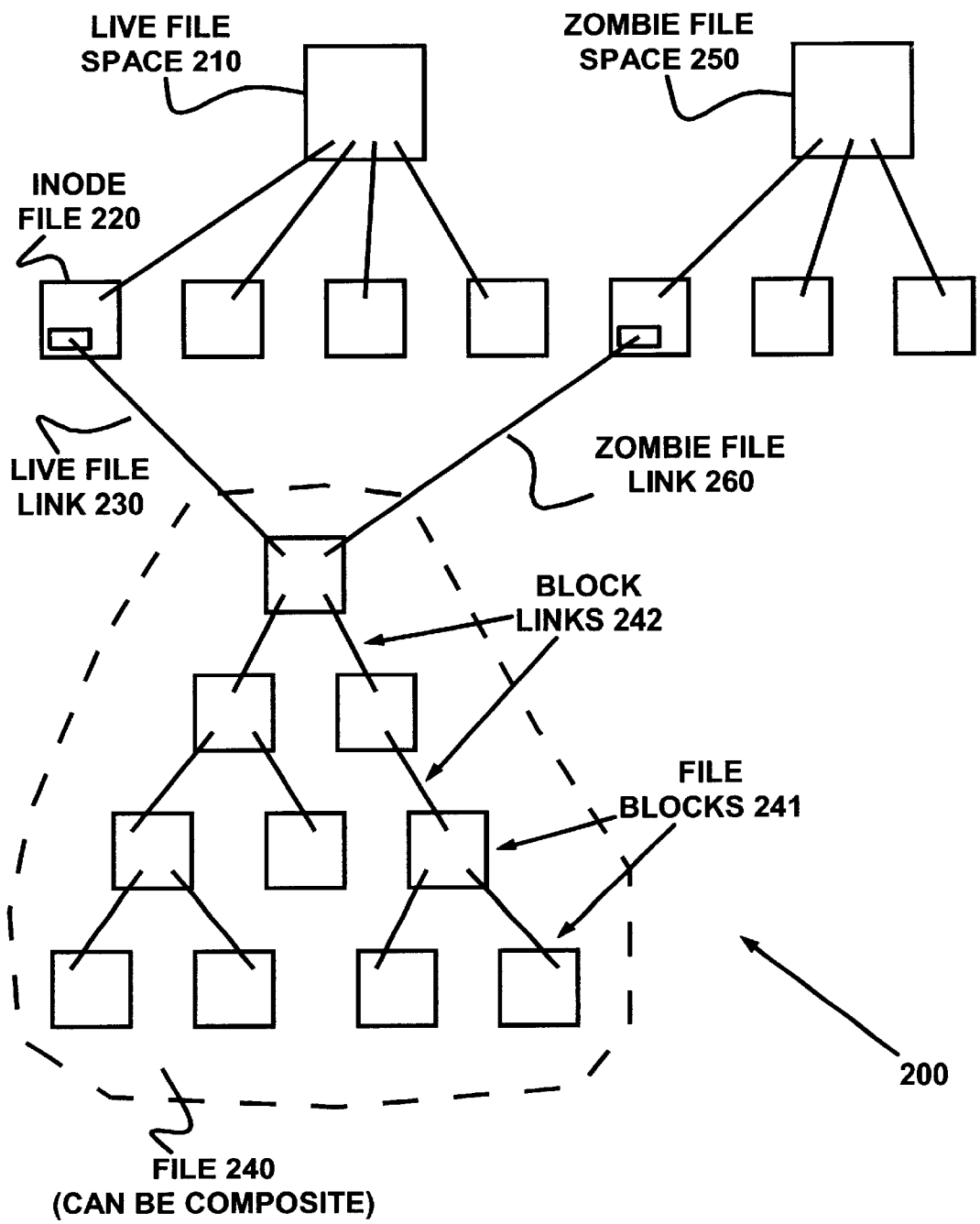
FIG. 2 illustrates a file structure in a system using a zombie file space.
Figure 3:
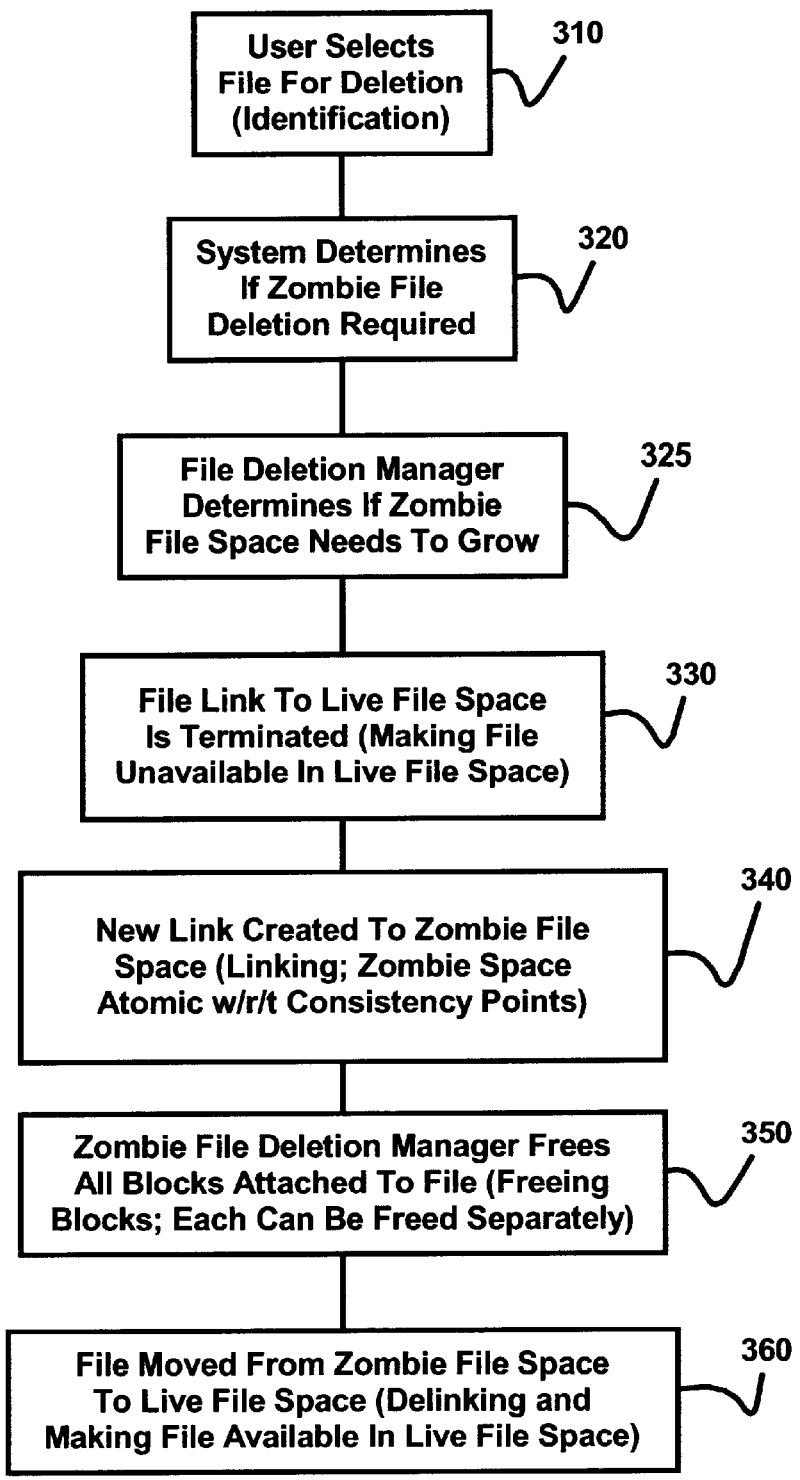
FIG. 3 shows a process flow diagram for file deletion in a method for operating a system for manipulation of zombie files and evil-twin files.
Figure 4:
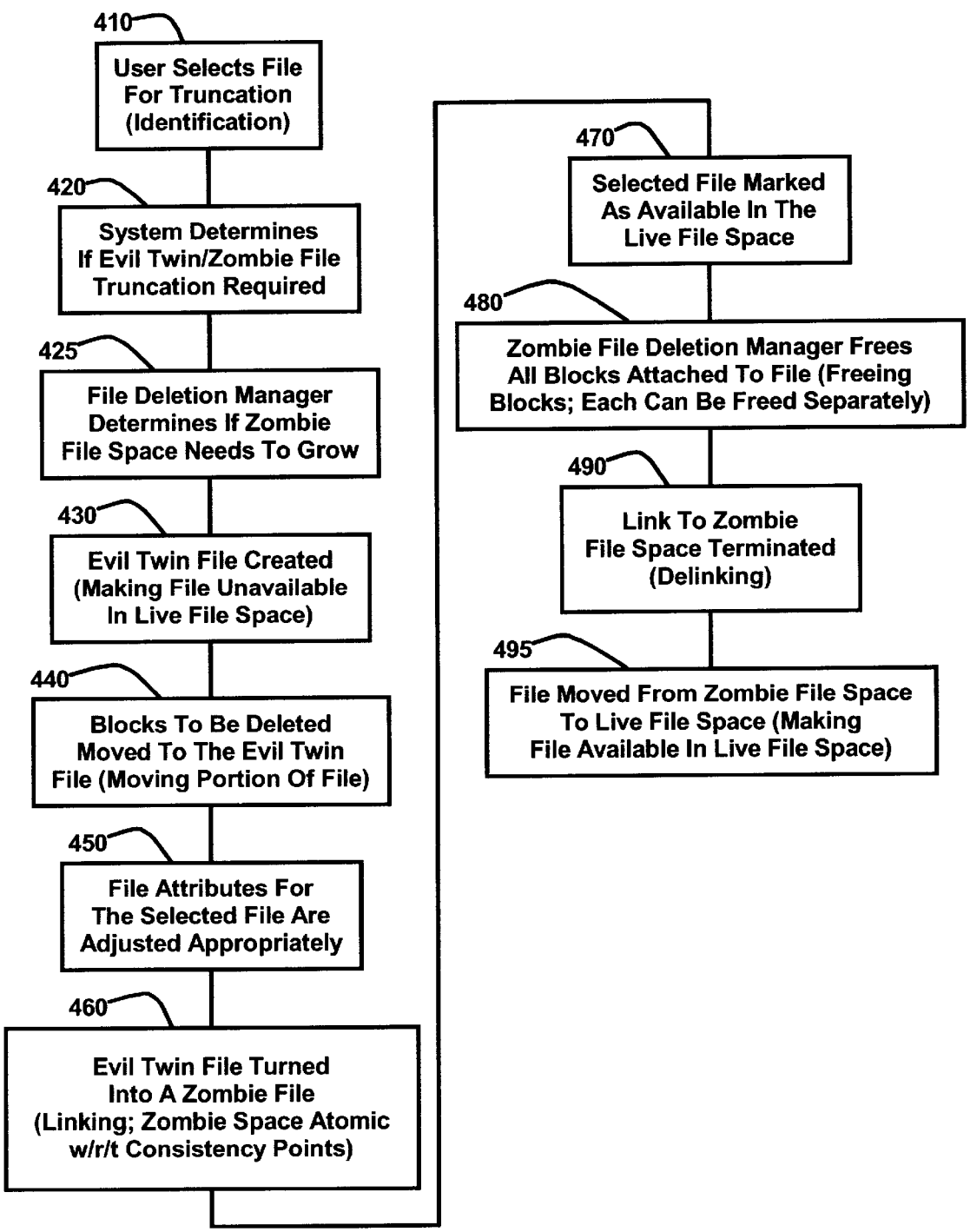
FIG. 4 shows a process flow diagram for file truncation in a method for operating a system Manipulation of Zombie Files and Evil-Twin Files.

FIG. 2 illustrates a file structure in a system using a zombie file space.

A file structure 200 includes, a live file space 210, an inode file 220, a live file link 230, a file 240, a zombie file space 250, and a zombie file link 260.

The live file space 210 contains the root block and all associated blocks of data for live files (I.e. files that may be accessed by users).

The inode file 220 is associated with the file to be deleted and contains information about the file.

The live file link 230, links a file to the live file space 210.

The file 240 includes a plurality of file blocks 241, and a plurality of block links 242. The file blocks 241 are connected by the plurality of block links 242. The file 240 is illustrative of a file to be deleted. The structure of the file as defined above is a hierarchical tree-like structure, however, there is no requirement in any embodiment of the invention that the invention be applied only to file structures of this type. The use of a hierarchical tree-like structure filing system is intended to be illustrative only and not limiting.

The zombie file space 250 contains the root block and all associated blocks of data for zombie files (I.e. files that are in the process of being deleted).

The zombie file link 260, links a file to be deleted to the zombie file space 250. A file that has been linked to the zombie file space 250 is referred to as a "zombie file" while it is so linked.

Method of Operation—File Deletion

A method 300 includes a set of flow points and a set of steps. The system 100 performs the method 300. Although the method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except where so indicated.

At a flow point 310, a system user selects the file 240 for deletion. User interfaces for this activity vary from system to system but are well known in the art.

At a flow point 320, the file 240 is identified by the system as a large file requiring zombie processing. In a preferred embodiment, the specific size of a file necessary to trigger zombie processing is parameter-based, software-selectable, however, it can be any set of instructions supporting this functionality, such as instructions hard-coded on a computer chip.

At a flow point 325, the file deletion manager determines whether the zombie filespace 250 needs to be enlarged to accommodate another zombie file, and if necessary enlarges the zombie filespace.

At a flow point 330, the link connecting the file 240 to the live file space 210 is terminated. At this point the file 240 is no longer available to users connected to the file server 110.

At a flow point 340, the file 240 is linked to the zombie file space 250 via the zombie file link 260. At this point, file 240 is referred to as a zombie file.

At a flow point 350, the zombie file deletion manager starts deleting portions of the file 240 by terminating block links 242 at the outer leaves of the file tree. As file blocks 241 are deleted by the zombie deletion manager, they become available for storage of other data. This fact is reflected in the free space indicator of the mass storage 120.

At a flow point 360, the file 240 is moved from the zombie filespace to the live filespace.

Method of Operation—File Truncation

A method 400 includes a set of flow points and a set of steps. The system 100 performs the method 400. Although the method 400 is described serially, the steps of the method 400 can be performed by separate elements in conjunction or in parallel, whether asynchronously, in a pipelined manner, or otherwise. There is no particular requirement that the method 400 be performed in the same order in which this description lists the steps, except where so indicated.

At a flow point 410, a system user selects the file 240 for truncation. User interfaces for this activity vary from system to system but are well known in the art.

At a flow point 420, the system identifies the amount of the file to be truncated as requiring evil twin/zombie processing. In the preferred embodiment, the specific amount of data to be truncated necessary to trigger evil twin/zombie processing is parameter-based software-selectable; however, it can be any set of instructions supporting this functionality, such as instructions hard-coded on a computer chip.

At a flow point 425, the file deletion manager determines whether the zombie filespace 250 needs to be enlarged to accommodate another zombie file, and if necessary enlarges the zombie filespace.

At a flow point 430, an evil twin file is created. At this point the file 240 is unavailable to the user.

At a flow point 440, blocks of data to be truncated are moved from the file 240 to the evil twin file.

At a flow point 450, file attributes for the file 240 are adjusted appropriately (E.g. The size of the file).

At a flow point 460, the evil twin file is turned into a zombie file. It is connected to the zombie file space.

At a flow point 470, the file 240 is marked as available in the live file space. At this point the file 240 is available to all users.

At a flow point 480, the zombie deletion manager frees all blocks attached to the zombie file.

At a flow point 490, the zombie file has been deleted and the link to the zombie file space is terminated.

At a flow point 495, the file 240 is moved from the zombie filespace to the live filespace.

Generality of the Invention

The invention has general applicability to various fields of use, not necessarily related to the services described above. For example, these fields of use can include one or more of, or some combination of, the following:

The invention is applicable to all computer systems utilizing large files.

Other and further applications of the invention in its most general form, will be clear to those skilled in the art after perusal of this application, and are within the scope and spirit of the invention.

Although preferred embodiments are disclosed herein, many variations are possible which remain within the concept, scope, and spirit of the invention, and these variations would become clear to those skilled in the art after perusal of this application.

What is claimed is:

1. A method of operating a file server, comprising the steps of:
   identifying a file for deletion or truncation;
   making said file unavailable to system users in a first file space;
   linking said file to a second file space used for longer file operations than those performed in said first file space;
   freeing blocks of said file while maintaining file consistency between check-pointed intervals; and
   delinking said file from said second file space and making said file available to system users in said first file space if said file was identified for truncation.

2. The method of claim 1, wherein said file is a composite file.

3. The method of claim 1, wherein each element of said composite file is deleted or truncated separately.

4. The method of claim 1, wherein deleting or truncating said file is performed in atomic units.

5. The method of claim 1, wherein said second file space is a zombie file space.

6. A method of operating a file server, comprising the steps of:

identifying a file for truncation;

making said file unavailable to system users in a first file space;

moving a portion of said file to a second file;

linking said second file to a second file space used for longer file operations than those performed in said first file space;

making said file available to system users in said first file space; and deleting said second file while maintaining file consistency between check-pointed intervals.

7. The method of claim 6, wherein deleting said second file is performed in atomic units.

8. The method of claim 6, wherein said second file space is a zombie file space.

9. A file server, comprising:

a processor;

memory;

a network interface; and mass storage;

wherein said processor operates under program control in said memory to control access to said mass storage, said program control including the steps of: (a) identifying a file for deletion or truncation; (b) making said file unavailable to system users in a first file space; (c) linking said file to a second file space used for longer file operations than those performed in said first file space; (d) freeing blocks of said file while maintaining file consistency between check-pointed intervals; and (e) delinking said file from said second file space and making said file available to system users in said first file space if said file was identified for truncation.

10. The file server of claim 9, wherein said file is a composite file.

11. The file server of claim 9, wherein each element of said composite file is deleted or truncated separately.

12. The file server of claim 9, wherein deleting or truncating said file is performed in atomic units.

13. The file server of claim 9, wherein said second file space is a zombie file space.

14. A file server, comprising:

a processor;

memory;

a network interface; and mass storage;

wherein said processor operates under program control in said memory to control access to said mass storage, said program control including the steps of: (a) identifying a file in said mass storage for truncation; (b) making said file unavailable to system users in a first file space; (c) moving a portion of said file to a second file; (d) linking said second file to a second file space used for longer file operations than those performed in said first file space; (e) making said file available to system users in said first file space; and (f) deleting said second file while maintaining file consistency between check-pointed intervals.

15. The file server of claim 14, wherein deleting said second file is performed in atomic units.

16. The file server of claim 14, wherein said second file space is a zombie file space.

17. A memory storing a program, said program comprising the steps of:

identifying a file for deletion or truncation;

making said file unavailable to system users in a first file space;

linking said file to a second file space used for longer file operations than those performed in said first file space;

freeing blocks of said file while maintaining file consistency between check-pointed intervals; and delinking said file from said second file space and making said file available to system users in said first file space if said file was identified for truncation.

18. The memory of claim 17, wherein said file is a composite file.

19. The memory of claim 17, wherein each element of said composite file is deleted or truncated separately.

20. The memory of claim 17, wherein deleting or truncating said file is performed in atomic units.

21. The memory of claim 17, wherein said second file space is a zombie file space.

22. A memory storing a program, said program comprising the steps of:

identifying a file for truncation;

making said file unavailable to system users in a first file space;

moving a portion of said file to a second file used for longer file operations than those performed in said first file space;

linking said second file to a second file space;

making said file available to system users in said first file space; and deleting said second file while maintaining file consistency between check-pointed intervals.

23. The memory of claim 22, wherein deleting said second file is performed in atomic units.

24. The memory of claim 22, wherein said second file space is a zombie file space.

25. The method of claim 1, further comprising the steps of delinking said file from said second file space and making said file available to system users in said first file space if said file was identified for deletion.

26. The file server of claim 9, wherein said program control further includes the steps of (f) delinking said file from said second file space and making said file available to system users in said first file space if said file was identified for deletion.

27. The memory of claim 17, wherein said program further comprises the steps of delinking said file from said second file space and making said file available to system users in said first file space if said file was identified for deletion.

* * * * *